(12) United States Patent  (10) Patent No.: US 7,962,800 B2
Hopkins et al.  (45) Date of Patent: Jun. 14, 2011

(54) METHOD AND SYSTEM FOR TRIGGERING A PROTOCOL ANALYZER

(75) Inventors: Richard Harry Hopkins, Southampton (GB); Jonathan Ian Settle, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 11/777,125

(22) Filed: Jul. 12, 2007

(65) Prior Publication Data

US 2008/0052561 A1 Feb. 28, 2008

(30) Foreign Application Priority Data

Jul. 12, 2006 (GB) .................................. 0613793.9

(51) Int. Cl.
*G06F 11/00* (2006.01)
(52) U.S. Cl. .......................................... 714/39; 714/27
(58) Field of Classification Search .................... 714/27, 714/39
See application file for complete search history.

(56) References Cited

U.S. PATENT DOCUMENTS

| 5,347,524 | A | * | 9/1994 | I'Anson et al. | 714/39 |
| 5,923,834 | A | * | 7/1999 | Thieret et al. | 714/25 |
| 7,228,348 | B1 | * | 6/2007 | Farley et al. | 709/224 |
| 7,254,115 | B1 | * | 8/2007 | Lakhanpal et al. | 370/257 |
| 7,257,736 | B2 | * | 8/2007 | Dunn et al. | 714/39 |
| 7,535,824 | B2 | * | 5/2009 | Wallenius | 370/216 |
| 2002/0103937 | A1 | * | 8/2002 | Tillmann et al. | 709/246 |
| 2002/0133588 | A1 | * | 9/2002 | Doyle et al. | 709/224 |
| 2003/0095310 | A1 | * | 5/2003 | Tillmann et al. | 359/133 |
| 2006/0068475 | A1 | * | 3/2006 | Foody | 435/105 |
| 2006/0198318 | A1 | * | 9/2006 | Schondelmayer et al. | 370/252 |
| 2006/0264178 | A1 | * | 11/2006 | Noble et al. | 455/67.11 |
| 2007/0115834 | A1 | * | 5/2007 | Cuni et al. | 370/241 |
| 2007/0253402 | A1 | * | 11/2007 | Noble | 370/351 |

* cited by examiner

*Primary Examiner* — Scott T Baderman
*Assistant Examiner* — Sarai Butler
(74) *Attorney, Agent, or Firm* — Kunzler Needham Massey & Thorpe

(57) ABSTRACT

A protocol analyzer is provided including a monitoring state machine for tracking a communication protocol. A trigger mechanism triggers a trace by the analyzer when the state of the protocol differs from the monitoring state machine. The state of the protocol differs from the monitoring state machine when no state change occurs in a pre-defined time period, which may be defined for a given state change. The state of the protocol also differs from the monitoring state machine when a different state change takes place to that indicated by the monitoring state machine.

20 Claims, 6 Drawing Sheets

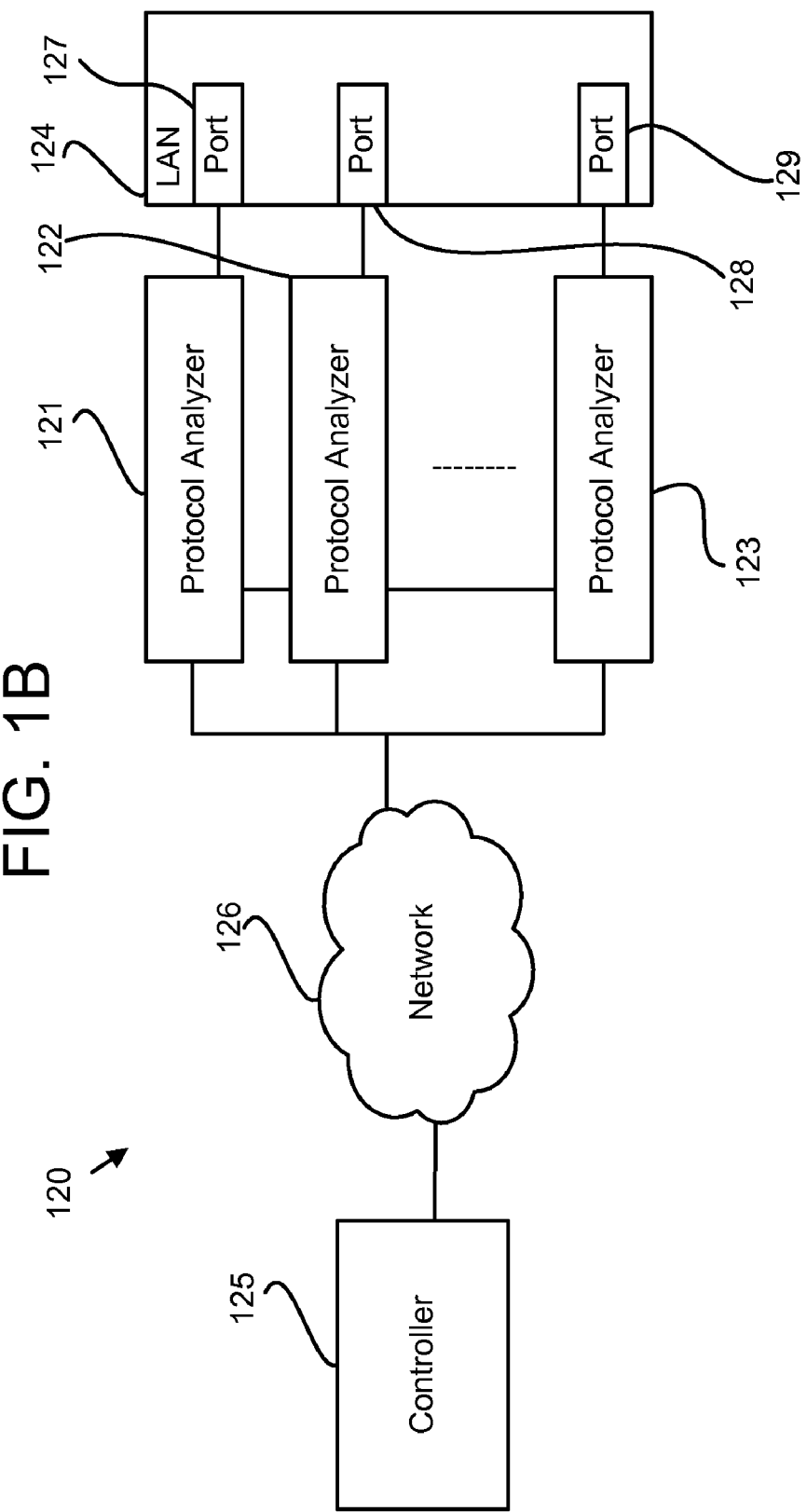

METHOD AND SYSTEM FOR TRIGGERING A PROTOCOL ANALYZER

CROSS-REFERENCES TO RELATED APPLICATIONS

This application claims priority to United Kingdom Patent Application Number 0613793.9 entitled "METHOD AND SYSTEM FOR TRIGGERING A PROTOCOL ANALYSER" and filed on Jul. 12, 2006 for Richard Hopkins et al., which is incorporated herein by reference.

BACKGROUND OF THE INVENTION

1. Field of the Invention

This invention relates to the field of protocol analyzers. In particular, it relates to triggering mechanisms in protocol analyzers.

2. Description of the Related Art

Protocol analyzers are used for monitoring, analyzing and testing high-speed serial storage area networks (SANs) and sub-systems. The systems that are analyzed may, for example, use high-speed serial protocols such as Fibre Channel, Ethernet, and Serial Attached Small Computer System Interface/Serial Advanced Technology Attachment (SAS/SATA) protocols.

Protocol analyzers resolve events that cause performance problems into human readable form and enable users to design, implement, test, and evaluate SANs and their components. As the systems being analyzed use high-speed interfaces, limited buffers are available to capture events of interest. Therefore, the analyzer must be programmed to be a triggered to record specific events.

A trace tool application of an analyzer is used to define specific conditions under which a capture of events triggers and stops. The trace tool provides a traffic library with pre-defined and user-defined templates for frames, ordered sets, and errors which can be used for triggers. For example, a trace control can be configured to wait for a specific network traffic condition to occur, such as a certain frame type, before beginning a capture.

If there is a sequence of events that can be predicted easily, or if patterns are repeatable and unique to a failure mode, it is straightforward to trigger the trace at the required event. However, there are instances where the trace needs to be triggered when there is a lack of an event. This may happen when an event should have occurred but did not, or if a different event occurred in its place.

SUMMARY OF THE INVENTION

From the foregoing discussion, there is a need for a method and system that triggers a protocol analyzer. Beneficially, such a method and system would support triggering on a lack of an event.

The present invention has been developed in response to the present state of the art, and in particular, in response to the problems and needs in the art that have not yet been fully solved by currently available triggering methods. Accordingly, the present invention has been developed to provide a method and system for triggering a protocol analyzer that overcome many or all of the above-discussed shortcomings in the art.

A method and system of the present invention is presented for triggering a protocol analyzer. A triggering mechanism monitors incoming signals of a communication protocol. A monitoring state machine tracks a state of the communication protocol. The triggering mechanism compares the state of the communication protocol and a state of the monitoring state machine, triggering an analyzer trace when the state of the communication protocol differs from state of the monitoring state machine.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention triggers a protocol analyzer when a state of a communication protocol differs from a state of a monitoring state machine. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 1A and 1B are block diagrams of protocol analyzer systems in accordance with the present invention;

DETAILED DESCRIPTION OF THE INVENTION

Protocol analyzers monitor, analyze, and test high-speed serial SANs and sub-systems. The described system and method can be applied to any protocol, but exemplary embodiments are described using high-speed serial protocols, for example, such as Fibre Channel, Ethernet, and Serial Attached SCSI/Serial ATA protocols.

Figure 1A:
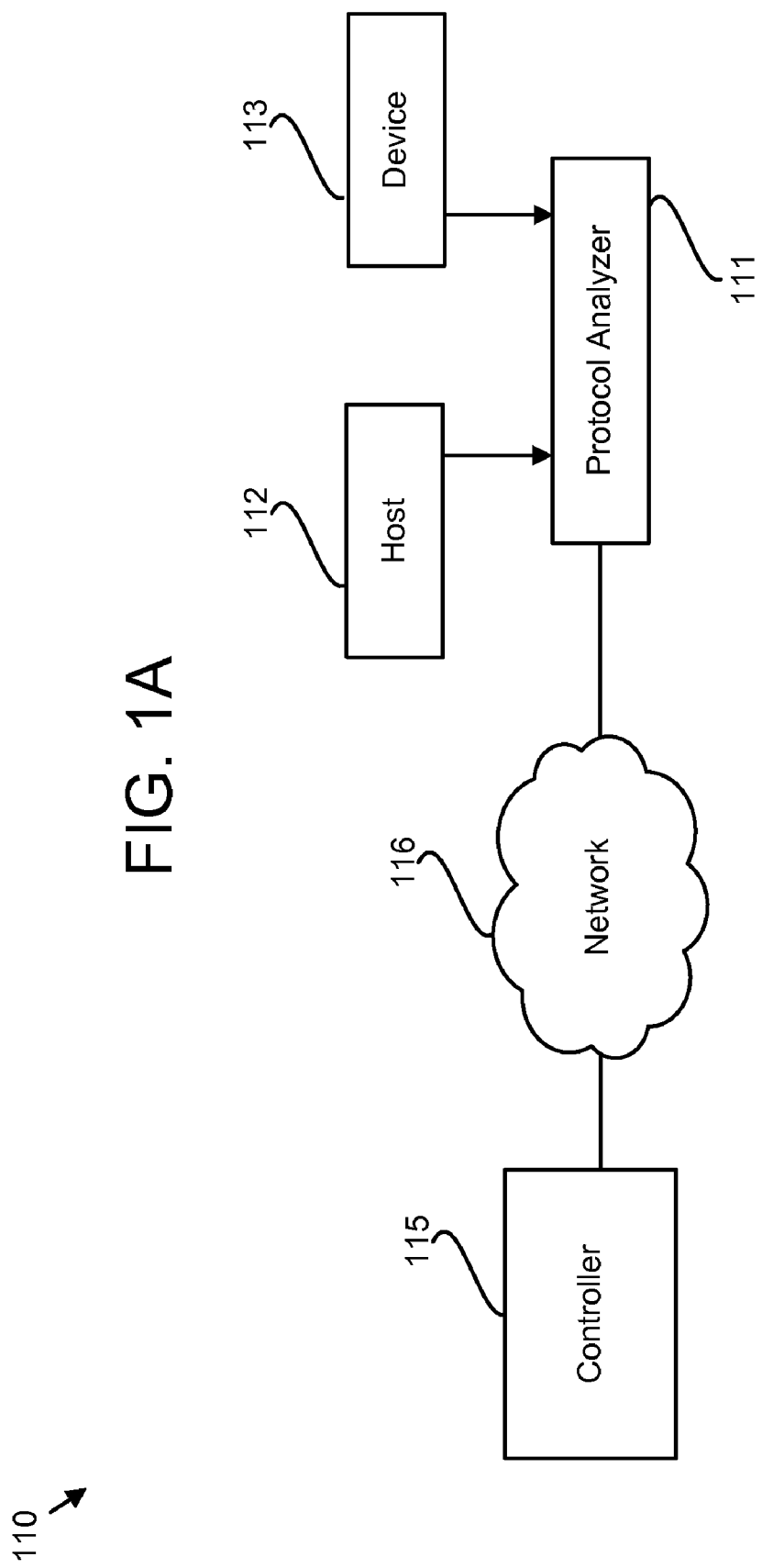

FIGS. 1A and 1B show example arrangements of protocol analyzers. In FIG. 1A, a system 110 is shown with a protocol analyzer 111 placed in line on a link between a host 112 and a storage device 113. A user with a control computer 115 can access the protocol analyzer 111 via a network 116 to instruct the analyzer traces.

In FIG. 1B, a system 120 is shown with a plurality of protocol analyzers 121-123 cascaded together to form a group providing support for analysis of ports 127-129 of a SAN 124. Again, a user with a control computer 125 can access the protocol analyzers 121-123 via a network 126.

FIGS. 1A and 1B are example arrangements of protocol analyzers. Protocol analyzers may be provided in many different arrangements. Protocol analyzers may have many ports or links, as there may be many links in a loop being analyzed. In some systems, many protocol analyzers are linked together and will automatically trigger if any one of the protocol analyzers triggers.

In each case, the control computer 115, 125 has a graphical user interface (GUI) through which a user can define triggers for traces of the protocol analyzers 111, 121-123 and can read the resultant trace.

Figure 2A:
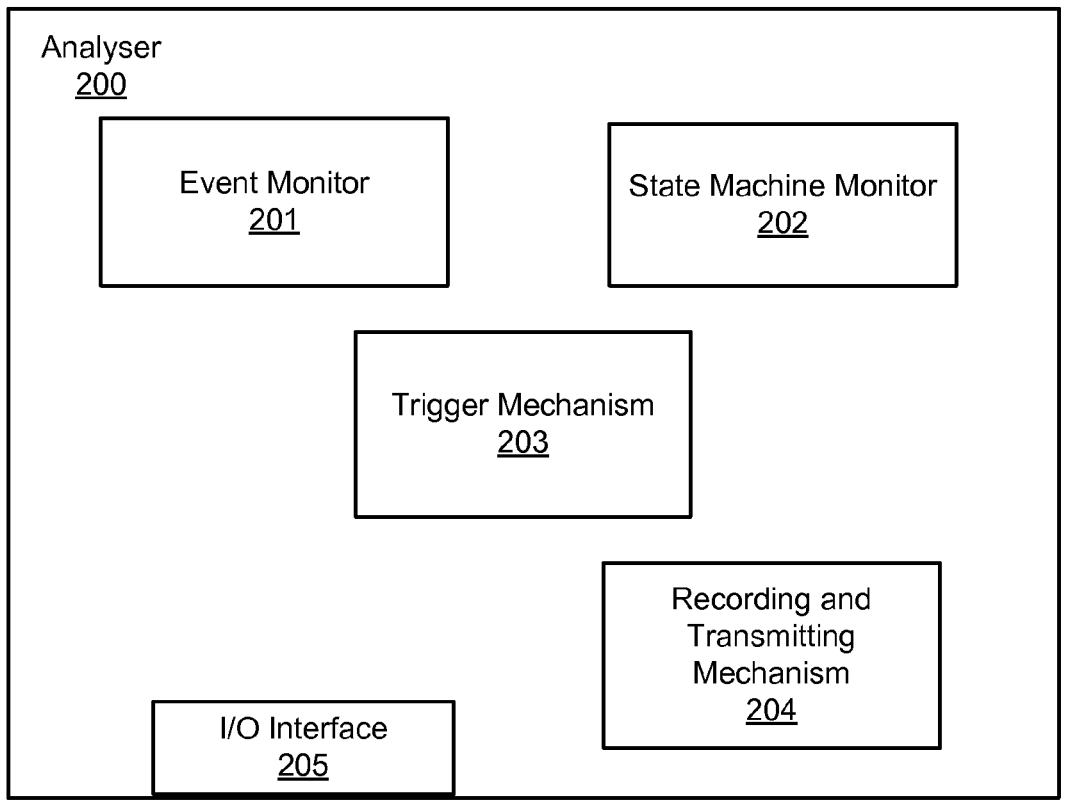
FIG. 2A is a block diagram of a protocol analyzer in accordance with the present invention.

Referring to FIG. 2A further details of a protocol analyzer 200 are shown. The protocol analyzer 200 includes a monitor for events 201 such as frames/order sets and other pre-defined or user-defined triggering events. The protocol analyzer 200 also includes a trigger mechanism 203 to start and stop a trace. A recording mechanism 204 records a trace and transmits it to a control computer 115, 125. An input/output interface 205 receives and transmits signals to/from the protocol analyzer 200.

The described protocol analyzer 200 also includes a state machine monitor 202. The state machine monitor 202 is a modified state machine as used in the port, link or loop being monitored by the protocol analyzer 200. State machines of an element being monitored specify the order of operational calls in an interface protocol and calls events.

In conventional systems, a protocol analyzer 200 does not understand the state machine of a monitored port, link, or loop. However, drives, adapters, switches etc. of the monitored system do. Therefore, a state machine monitor 202 is provided in the protocol analyzer 200 to keep track of the state machine of the monitored element. This enables behavior to be captured as traces of atomic events.

The state machine monitor 202 is a passive version of a state machine used in the analyzed system. The state machine jumps are defined by the protocol standard. The state machine monitor 202 accepts stimulus from the monitored system and will move to the correct state indicated by the state machine, but no process is carried out by the state machine monitor 202. The protocol analyzer 200 is a passive device which does not take part in the protocol. The state machine monitor 202 follows the changes in state without taking any action itself.

Within each state in a system state machine, there may be a time out applied, which is set by the standard. These time outs are generally very large and, if they fire, the system tries to set the protocol back to a known state.

The state machine monitor 202 of the described system allows the time out of each of state machine to be modified to receive a knowledge if they fire. If a time out fires, a trace can be stopped and analyzed to understand why this has occurred.

The state machine monitor 202 can also be set up to include any illegal stimulus. For example, the analysis can be triggered if a frame received is a valid frame but for a different state to the state currently in.

Figure 2B:
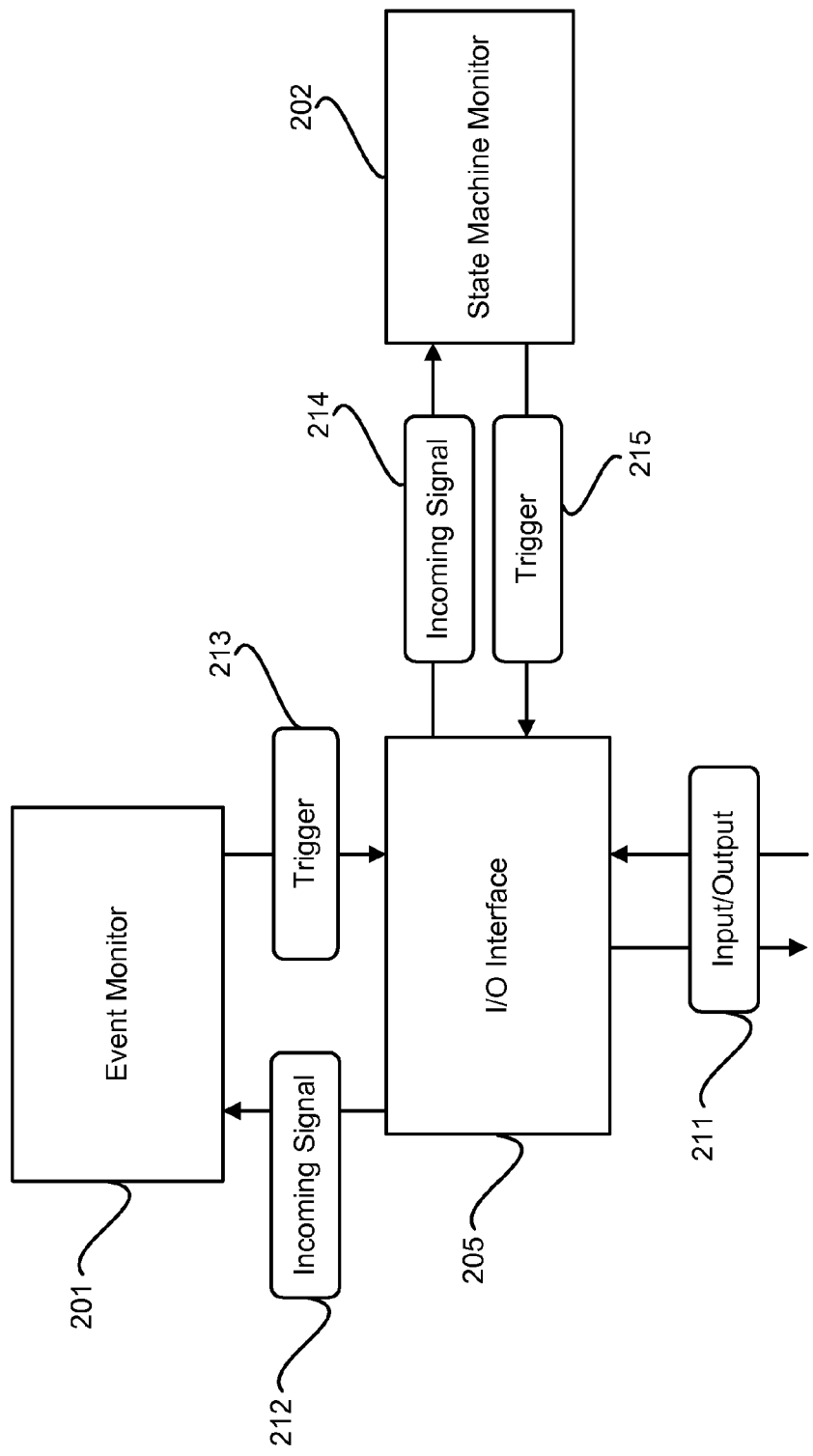
FIG. 2B is a schematic diagram of the protocol analyzer of FIG. 2A showing inputs and outputs.

FIG. 2B, shows the components of the protocol analyzer 200 of FIG. 2A with inputs and outputs shown with rounded edges. The input/output interface 205 sends and receives signals 211. The monitor for events 201 monitors incoming signals 212 and triggers 213 a trace when a pre-defined event is identified.

The state machine monitor 202 compares the incoming signals 214 with the state machine sequence to monitor any differences. For example, the state machine monitor 202 may see if an illegal event has taken place, if an expected state jump has not occurred, or if no event has occurred in a pre-defined time out period. If so, then the state machine monitor 202 triggers 215 a trace.

In this way, the protocol analyzer 200 is programmed to understand the state of the link, port or loop that it is monitoring and to trigger on an anomaly with the expected events.

The state machine monitor 202 includes a time out mechanism which can be user defined for different occurrences. The time out can measure the time from a last event and trigger when a next event has not occurred. The duration of the time out can be specified for different types of event (or non-event).

Figure 3:
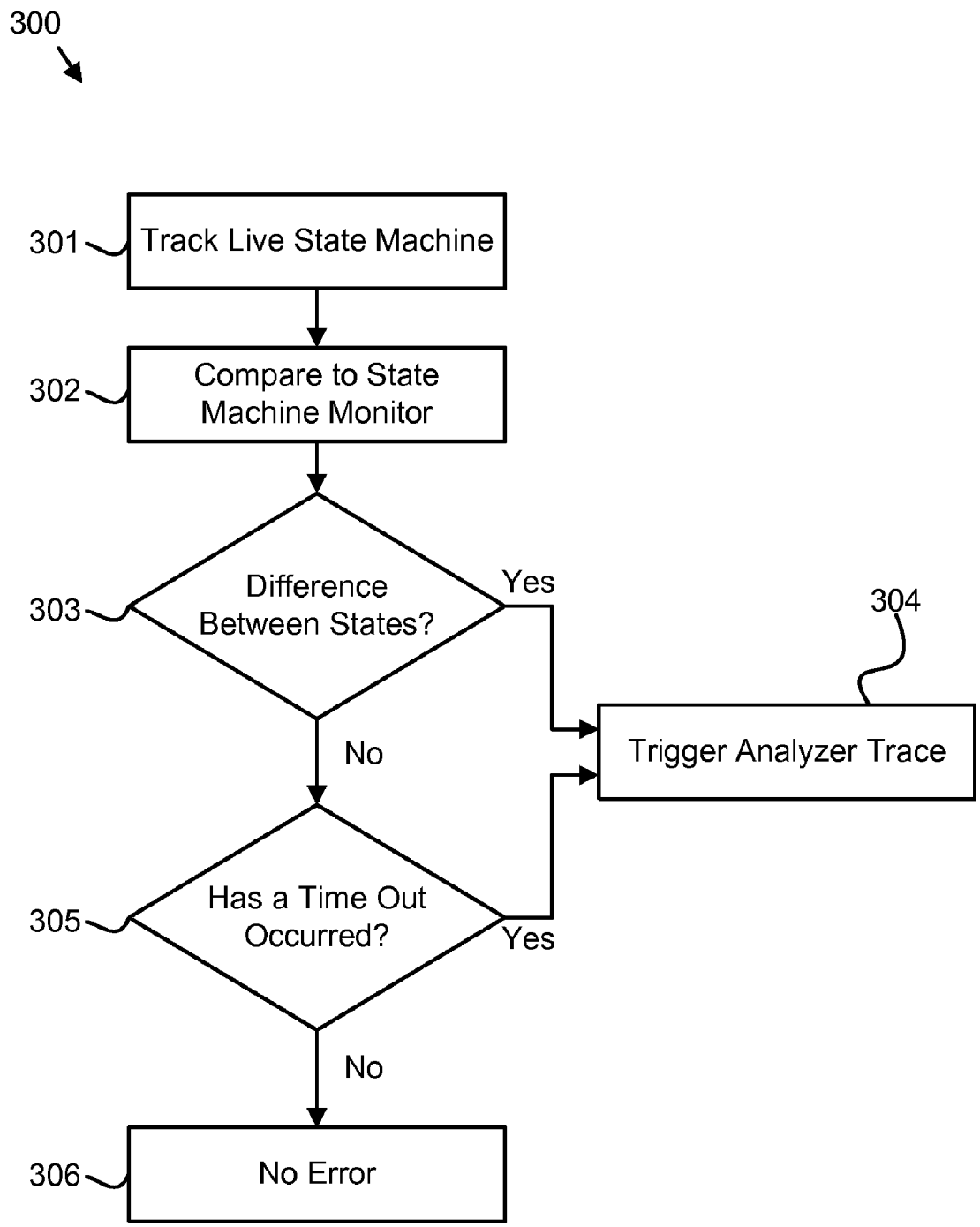
FIG. 3 is a flow diagram of a triggering method in accordance with the present invention.

Referring now to FIG. 3, a flow diagram 300 of the described method is shown. A live state machine of a monitored element is tracked 301 by comparing its states with a state machine monitor of the protocol analyzer 302. It is noted if there is a difference 303 between the live state machine and the state machine monitor. If there is a difference, a trigger 304 starts a trace to record the protocol.

If there is no difference, it is determined if a time out 305 from the last event has occurred. If the time out expires with no event, then a trigger 304 starts a trace. If the expected event occurs before the expiry of the time out, there is no error 306 and the monitoring continues.

Example embodiments are now described in specific example protocols. A first example embodiment is provided in a Fibre Channel Arbitrated Loop environment (FC-AL).

During initialization of a loop, a Loop Initialization Procedure (LIP) allows each port 127-129 to obtain an Arbitrated Loop Physical Address (AL_PA) that is unique within the loop for that port. This effectively uniquely identifies each port 127-129 in a loop.

Each port 127-129 continuously transmits Loop Initialization Sequences (LI_ID="LISM") around the loop that contains the Port Name (the WWPN). The port with the lowest Port Name will become the master and will receive the LISM that it sent. Ports 127-129 will discard a LISM if their Port Name is lower. The maximum time taken to make this decision is AL_TIME as defined in the FC-AL standard as the time in which frames are expected to have traveled around the loop.

The loop initialization involves one port winning as Loop Initialization Master (LIM). The LIM port manages the rest of the initialization procedure.

The Arbitrated Loop Physical Addresses (AL_PAs) are then allocated to each of the ports 127-129 in the loop. The LIM sends a frame around the loop with bits corresponding to AL_PAs. Each port 127-129 finds the relevant bit for its AL_PA and changes the bit from "0" to "1" indicating that the AL_PA is not available for subsequent ports. The AL_PAs can be defined by previous addresses, assigned hardware addresses or software addresses. If there are multiple enclosures, each address indicates the enclosure and the device within the enclosure ensuring that each port in a loop has a unique address.

The LIM transmits four Loop Initialization Sequences that contain AL_PA bit maps, which are Loop Initialization Fabric Assigned Frame (LIFA) for Fabric Assigned AL_PA, Loop Initialization Previously Assigned Frame (LIPA) for Previously Acquired AL_PA, Loop Initialization Hard Assigned Frame (LIHA) for Hard Assigned AL_PA, and Loop Initialization Soft Assigned Frame (LISA) for Soft Assigned AL_PA.

An example trigger may be that a drive is not forwarding Loop Initialization Select Master (LISM) frames in FC-AL. A trace could be set up to trigger if there is no state change in a port between LISM and LIFA within the fibre channel time out. A specific fibre channel time out can be configured for this port.

When the LISM phase is entered in FC-AL there are only a small number of valid state moves, with only one that progresses further though loop configuration, and a time out.

The protocol analyzer or analyzers monitoring the loop, each have state machine monitors which accept stimulus from the loop and will move to the correct state indicated by the state machine monitor. However, no action is carried out by the state machine monitors of the protocol analyzers. For example, if a LIP frame is received a state machine is defined to send a LISM out; however, the state machine monitor will advance the state within the monitor but will not send a frame out.

When a device on the loop sends a Loop Initialization Loop Position (LILP) frame round the loop, all the state machines move to the loop initiation state, including the protocol analyzer. The LISM would then start. As in conventional protocol analyzer systems, the protocol analyzer would still be forwarding fibre channel unmodified and would be a passive device on the system.

The LISM's frame may be stopped from being forwarded by a problem device. After a defined period the time out will occur and the protocol analyzer will trigger. If one port sees a time out, a trace on all ports are captured to aid in debugging.

This is one example when a time out could indicate problem. This solution would also work for illegal state jumps of devices, frames being sent out of context, etc. The protocol analyzer can be used to get very precise protocol traces of events which is very useful when there are lots of errors in the system and only one problem is to be traced.

Figure 4:
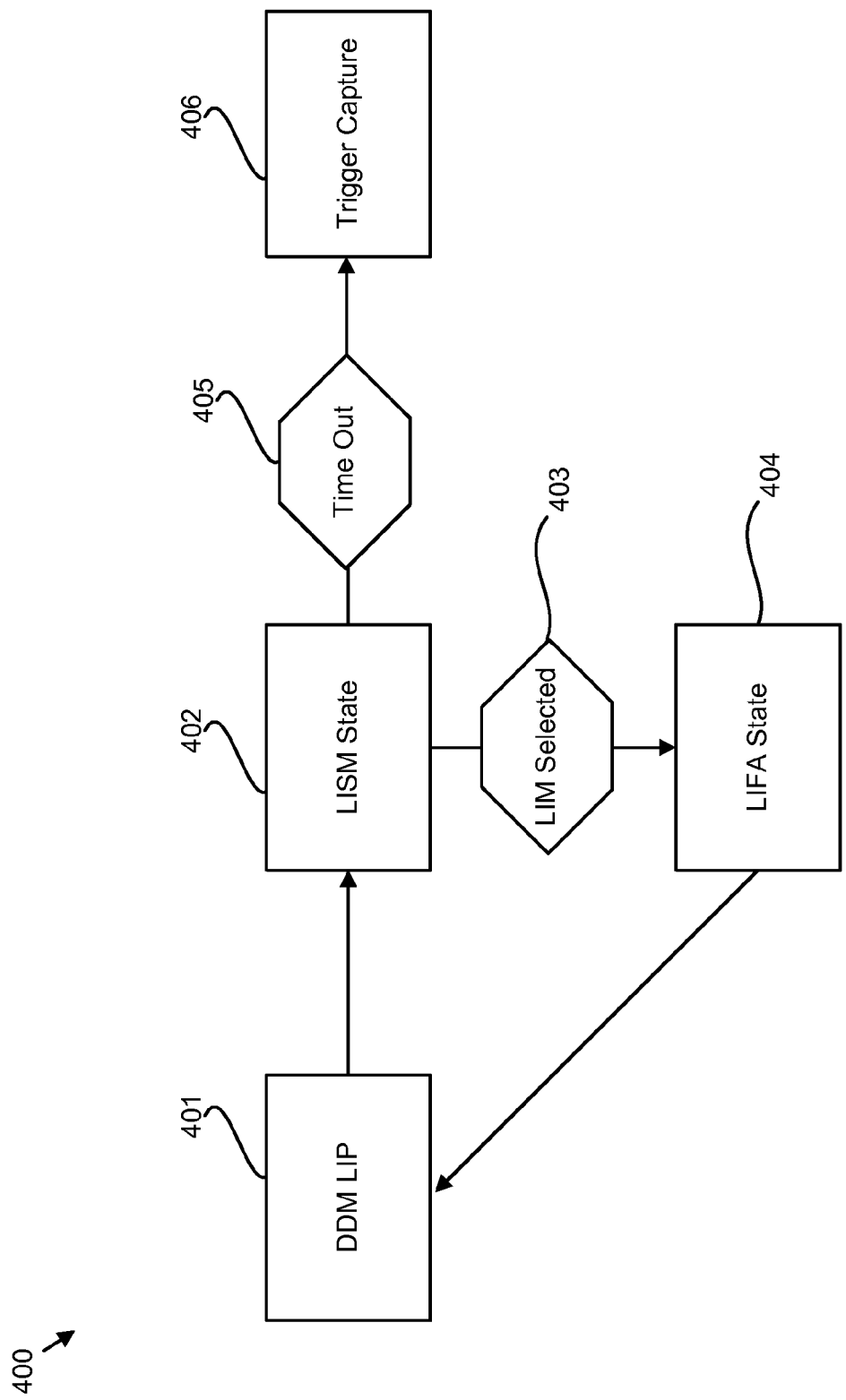
FIG. 4 is a schematic diagram of an example embodiment in a Fibre Channel environment.

FIG. 4 shows a schematic diagram 400 illustrating the state changes of the above FC-AL example. A disk drive (DDM) starts a loop initiation procedure (LIP) 401. A ports starts the LISM phase 402 (LI_ID="LISM"). If the loop becomes good, a loop master is selected 403 and the LIFA phase will start 404 with the ports changing state (LI_ID="LIFA"). Sometime later, the LIP will start again 401.

If an error occurs and the state change from LISM to LIFA does not occur, a time out 405 will indicate that the loop is stuck and will trigger 406 a trace capture.

A second example embodiment is provided in Serial Advanced Technology Attachment (SATA). In this embodiment, there is a problem were the SSP frame is not getting an Acknowledgement Frame (ACK) back. A Serial Small Computer System Interface (SCSI) Protocol (SSP) frame is an I/O frame that can be sent to a device on a SATA network and the protocol dictates that an ACK frame must be received to progress.

This problem would cause a port to undergo error recovery and an understanding of the problem is needed. With conventional analyzers, a special build is needed that would send a special frame to trigger the analyzer. With the described protocol analyzer, the analyzer would know that there was an SSP frame sent, and it would expect an ACK back with in 1 ms. The monitor state machine would see the SSP frame being set, and therefore know that link should have a response within 1 ms.

State machine monitors used in protocol analyzers of the described system can be implemented in software or, as generally done, with hardware assist. The invention can therefore take the form of an entirely hardware embodiment, an entirely software embodiment, or an embodiment containing both hardware and software elements. If the invention is implemented in software, this may include but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A protocol analyzer comprising:
a computer-readable medium storing a computer program;
an instruction execution system executing the computer program, the computer program comprising
a monitoring state machine tracking a live state machine that specifies an order of operation calls for a communication protocol of a device, wherein the monitoring state machine is a passive version of the live state machine, accepts stimulus from the device, and moves to an anticipated state for the order of operation calls of the communication protocol; and
a trigger mechanism triggering the protocol analyzer when a state of the live state machine defined by an operation call of the communication protocol differs from the anticipated state for the order of operation calls.

2. A protocol analyzer as claimed in claim 1, wherein the monitoring state machine moves to the anticipated state for a plurality of live state machines of a plurality of devices in communication with the communications protocol, and a state of each live state machine differs from the anticipated state of the monitoring state machine when no state change occurs in a pre-defined time period.

3. A protocol analyzer as claimed in claim 2, wherein the protocol analyzer includes a means for defining the pre-defined time period for a given state change.

4. A protocol analyzer as claimed in claim 1, wherein each state of the live state machine specifies an operation call of the communication protocol.

5. A protocol analyzer as claimed in claim 1, wherein the device is selected from a port, a link, and a loop in a storage area network.

6. A protocol analyzer as claimed claim 1, wherein the communication protocol is a high-speed serial communication protocol.

7. A protocol analyzer as claimed in claim 6, wherein the high-speed serial communication protocol is selected from Fibre Channel, Ethernet, and Serial Attached Small Computer System Interface/Serial Advanced Technology Attachment (SAS/SATA) protocols.

8. A method for triggering a protocol analyzer, comprising:
tracking with a monitoring state machine, by use of an instruction execution system, a live state machine that specifies an order of operation calls for a communication protocol of a device, wherein the monitoring state machine is a passive version of the live state machine, accepts stimulus from the device, and moves to an anticipated state for the order of operation calls of the communication protocol comparing a state of the live state machine defined by an operation call of the communication protocol to the anticipated state for the order of operation calls; and triggering an analyzer trace when the state of the live state machine differs from the anticipated state.

9. A method as claimed in claim 8, wherein the monitoring state machine moves to the anticipated state for a plurality of live state machines of a plurality of devices in communication with the communications protocol, and a state of each live state machine differs from the monitoring state machine when no state change occurs in a pre-defined time period.

10. A method as claimed in claim 9, further comprising defining the pre-defined time period for a given state change.

11. A method as claimed in claim 8, wherein the device is selected from a port, a link, and a loop in a storage area network.

12. A computer program product stored on a computer readable storage medium, comprising computer readable program code executed by a processor for performing the steps of:

tracking with a monitoring state machine a live state machine that specifies an order of operation calls for a communication protocol of a device, wherein the monitoring state machine is a passive version of the live state machine, accepts stimulus from the device, and moves to an anticipated state for the order of operation calls of the communication protocol;

comparing a state of the live state machine defined by an operation call of the communication protocol to the anticipated state for the order of operation calls; and triggering an analyzer trace when the state of the live state machine communication protocol differs from the anticipated state.

13. A computer program product as claimed in claim 12, wherein the monitoring state machine anticipates a state of a plurality of live state machines of a plurality of devices in communication with communications protocol, and the state of each live state machine differs from the anticipated state of the monitoring state machine when no state change occurs in a pre-defined time period.

14. A computer program product as claimed in claim 13, wherein the code performs the step of defining the pre-defined time period for a given state change.

15. A computer program product as claimed in claim 12, wherein the state of the live state machine differs from the anticipated state of the monitoring state machine when a different state change takes place to that indicated by the anticipated state of the monitoring state machine.

16. The protocol analyzer of claim 1, wherein the communication protocol is a Fibre Channel loop and the trigger mechanism triggers the protocol analyzer if there is no state change in the live state machine between a Loop Initialization Select Master frame (LISM) and a Loop Initialization Fabric Assigned frame (LIFA).

17. The method of claim 8, wherein the communications protocol is a Fibre Channel loop and further comprising triggering the protocol analyzer if there is no state change in the live state machine between a Loop Initialization Select Master frame (LISM) and a Loop Initialization Fabric Assigned frame (LIFA).

18. The method of claim 8, wherein each state of the live state machine specifies an operation call of the communication protocol.

19. The computer program product of claim 12, wherein the communications protocol is a Fibre Channel loop and further comprising triggering the protocol analyzer if there is no state change in the live state machine between a Loop Initialization Select Master frame (LISM) and a Loop Initialization Fabric Assigned frame (LIFA).

20. The computer program product of claim 12, wherein each state of the live state machine specifies an operation call of the communication protocol.

* * * * *